United States Patent
Ho

(10) Patent No.: US 6,575,579 B1
(45) Date of Patent: Jun. 10, 2003

(54) PROJECTING DEVICE WITH A CYLINDRICAL COLOR TUBE FOR DISPLAYING COLOR IMAGES

(75) Inventor: Leit Ho, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 09/558,223

(22) Filed: Apr. 26, 2000

(51) Int. Cl.⁷ .................................. G03B 21/14
(52) U.S. Cl. ..................... 353/84; 353/31; 348/743
(58) Field of Search ................ 353/84, 31, 33, 353/34, 37; 349/5, 8, 9; 348/742, 743, 771

(56) References Cited

U.S. PATENT DOCUMENTS 2,535,530 A * 12/1950 Clark et al. ............... 348/743
5,463,433 A * 10/1995 Koo ............................ 353/84
5,921,650 A * 7/1999 Doany et al. ............... 353/31
6,266,105 B1 * 7/2001 Gleckman ................. 348/743

* cited by examiner

Primary Examiner—William Dowling
(74) Attorney, Agent, or Firm—Winston Hsu

(57) ABSTRACT

A projecting device with a cylindrical color tube for displaying color images. The projecting device includes a light source for generating a trichrome light beam, a cylindrical color tube for filtering the trichrome light beam into red, green and blue light beams, a driving device for rotating the color tube, an optical modulator for converting an image signal into an image and modulating the image into the red, green and blue light beams outputted from the color tube to generate a modulated light beam, and a projecting lens installed in the housing for projecting the modulated light beam onto a screen.

9 Claims, 4 Drawing Sheets

PROJECTING DEVICE WITH A CYLINDRICAL COLOR TUBE FOR DISPLAYING COLOR IMAGES

BACKGROUND OF THE INVENTION

1. Field of the Invention

The invention relates to a projecting device, and more specifically, to a projecting device with a cylindrical color tube for displaying color images.

2. Description of the Prior Art

Commonly, images are displayed by a projecting device by projection onto a screen. The projecting device can display images of various colors.

Please refer to FIGS. 1 to 3. FIG. 1 is a perspective view of a prior art projecting device 10. FIG. 2 is a schematic diagram of the projecting device 10. FIG. 3 is a front view of the color wheel 18 in FIG. 2.

The projecting device 10 comprises a housing 12, a light source 14 installed in the housing 12 for generating a trichrome light beam 16, a color wheel 18 rotatably installed in the housing 12 having red, green and blue dichroic filters 20, 22, 24 installed on a surface of the color wheel 18 for filtering the trichrome light beam 16 into red, green and blue light beams 26, an electric motor 28 installed in the housing 12 for rotating the color wheel 18 so as to generate the red, green and blue light beams 26 one by one, a digital micromirror device (DMD) 30 installed in the housing 12 for converting an image signal into an image and modulating the image into each of the red, green and blue light beams 26 outputted from the color wheel 18 to generate a modulated light beam 32, and a projecting lens 34 installed in the housing 12 for projecting the modulated light beam 32 onto a screen 36.

The color wheel 18 can filter the trichrome light beam 16 into the red, green and blue light beams 26 one by one. However, the red, green and blue dichroic filters 20, 22, 24 each occupy a sector-shaped portion of the color wheel 18. Therefore, when filtering the light beam 16, it cannot pass through the center of the color wheel 18. Thus the color wheel 18 has to be made very large, increasing the size of the projecting device 10. The projecting device 10 is quite unmarketable because of its large size.

SUMMARY OF THE INVENTION

It is therefore a primary objective of the present invention to provide a projecting device to solve the above mentioned problem.

Briefly, in a preferred embodiment, the present invention provides a projecting device comprising a cylindrical color tube for filtering a trichrome light beam transmitted from a light source. The color tube has red, green and blue dichroic filters installed along its cylindrical side. When the trichrome light beam is transmitted through the color tube, it will be filtered into red, green and blue light beams. The red, green and blue light beams will be modulated to generate a modulated light beam. And the modulated light beam will be projected onto a screen.

It is an advantage of the present invention that the color tube has a very small size, reducing the size of the projecting device. This allows the projecting device to be quite marketable because of its small size.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
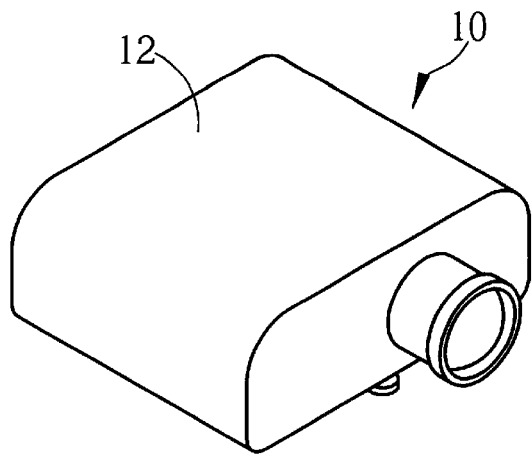
FIG. 1 is a perspective view of a prior art projecting device.
Figure 2:
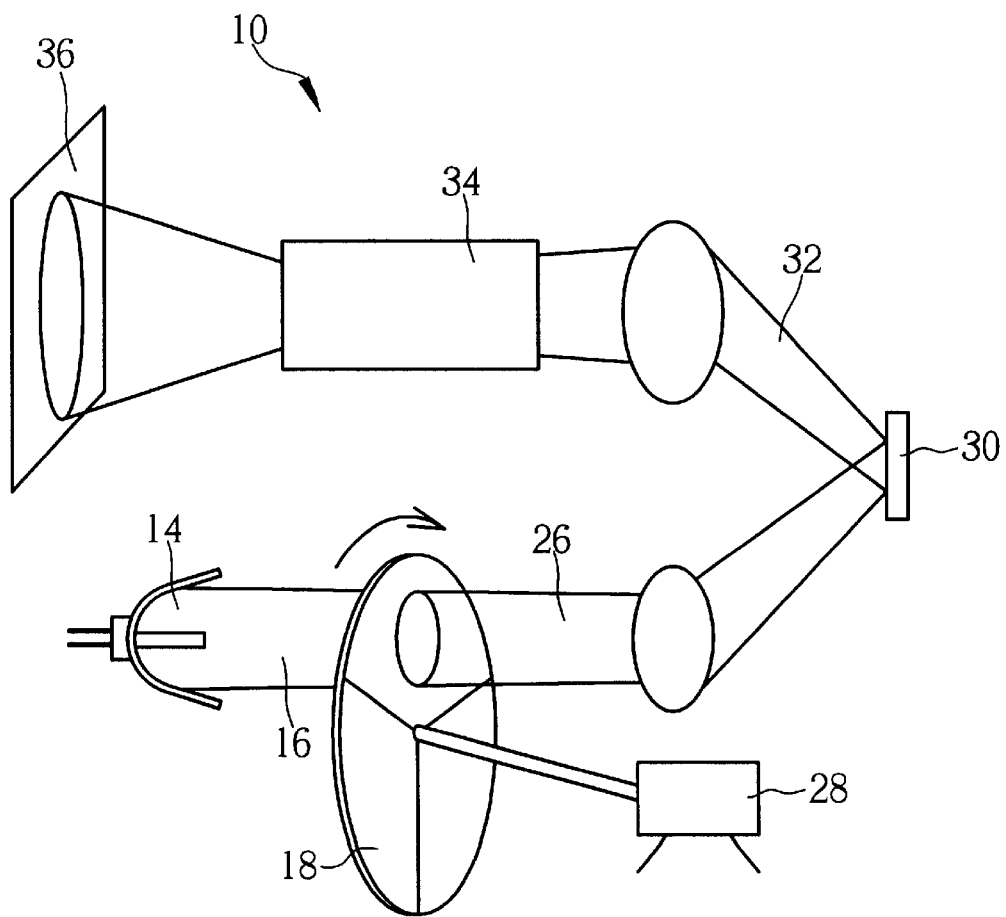
FIG. 2 is a schematic diagram of the projecting device in FIG. 1.
Figure 3:
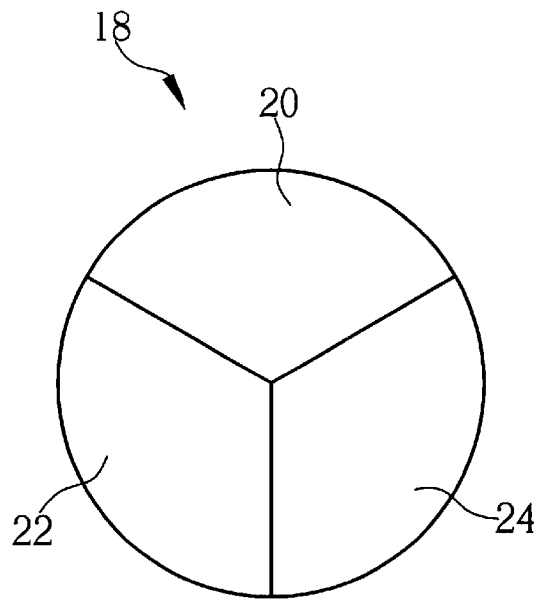
FIG. 3 is a front view of the color wheel in FIG. 2.
Figure 4:
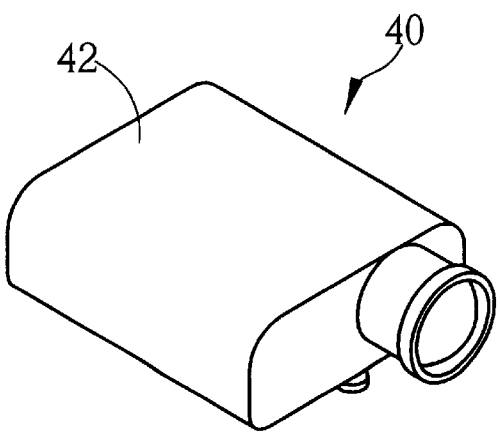
FIG. 4 is a perspective view of a projecting device according to the present invention.
Figure 5:
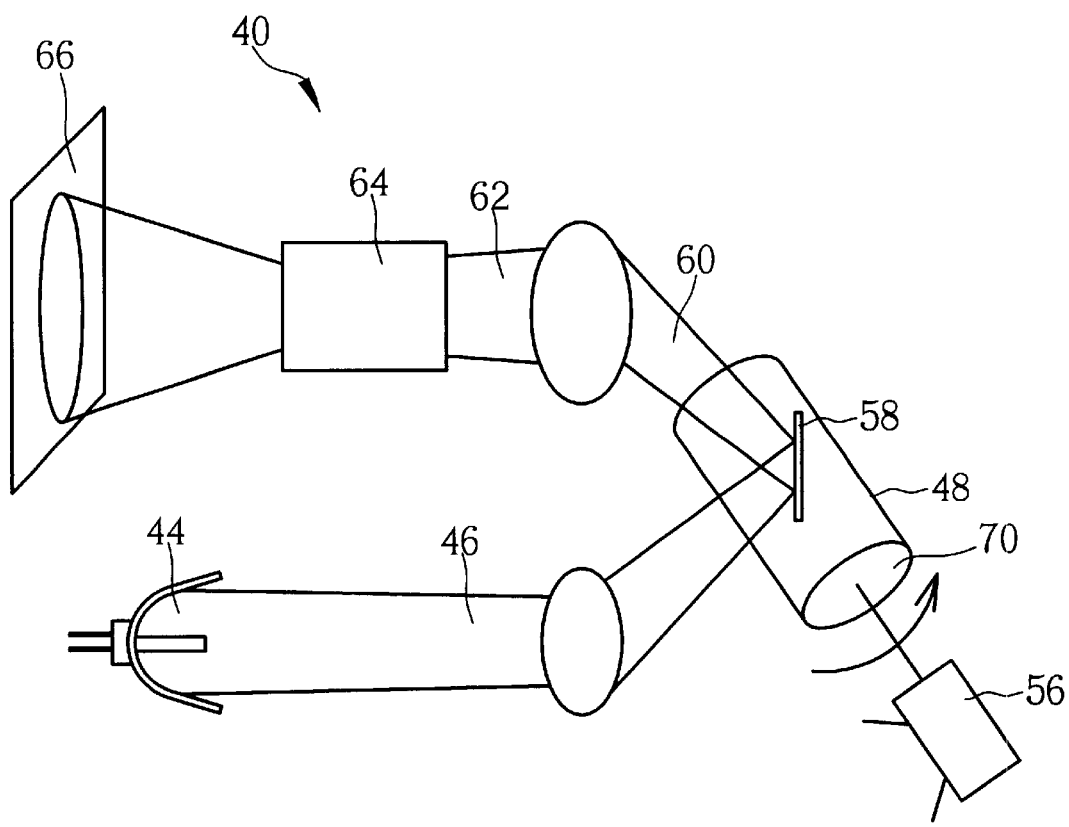
FIG. 5 is a schematic diagram of the projecting device in FIG. 4.
Figure 6:
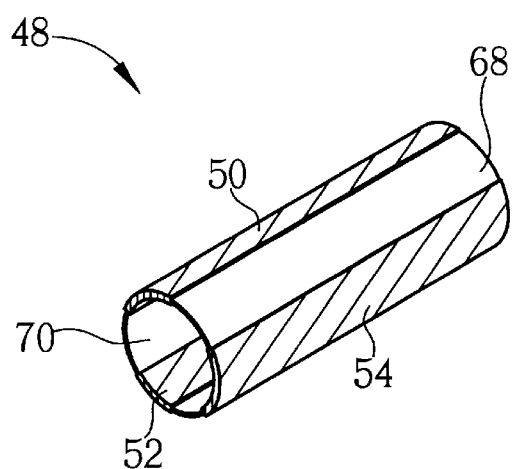
FIG. 6 is a perspective view of the color tube in FIG. 5.
Figure 7:
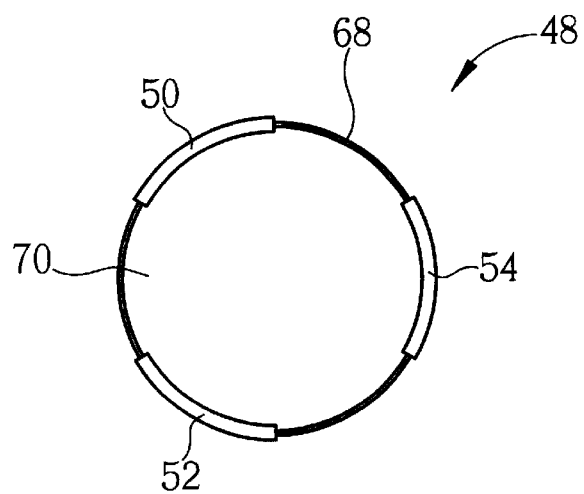
FIG. 7 is a top view of the color tube in FIG. 5.

Please refer to FIGS. 4 to 7. FIG. 4 is a perspective view of a projecting device 40 according to the present invention. FIG. 5 is a schematic diagram of the projecting device 40. FIG. 6 is a perspective view of the color tube 48 in FIG. 5. FIG. 7 is a top view of the color tube 48.

The projecting device 40 comprises a housing 42, a light source 44 installed in the housing 42 for generating a trichrome light beam 46, a cylindrical color tube 48 rotatably installed in the housing 42 having red, green and blue dichroic filters 50, 52, 54 installed along its cylindrical side 68 for filtering the trichrome light beam 46 into red, green and blue light beams 60, an electric motor 56 installed in the housing 42 for rotating the color tube 48 so as to generate the red, green and blue light beams 60 one by one, an optical modulator 58 installed in the housing 42 for converting an image signal into an image and modulating the image into each of the red, green and blue light beams 60 outputted from the color tube 48 to generate a modulated light beam 62, and a projecting lens 64 installed in the housing 42 for projecting the modulated light beam 62 onto a screen 66.

The cylindrical side 68 of the color tube 48 has two circular ends 70. The optical modulator 58 is positioned inside the cylindrical side 68 of the color tube 48. The red, green and blue light beams 60 generated by the dichroic filters 50, 52, 54 of the color tube 48 will be reflected by the optical modulator 58 toward one of the circular ends 70. Each of the dichroic filters 50, 52, 54 is of an approximately rectangular shape.

Figure 8:
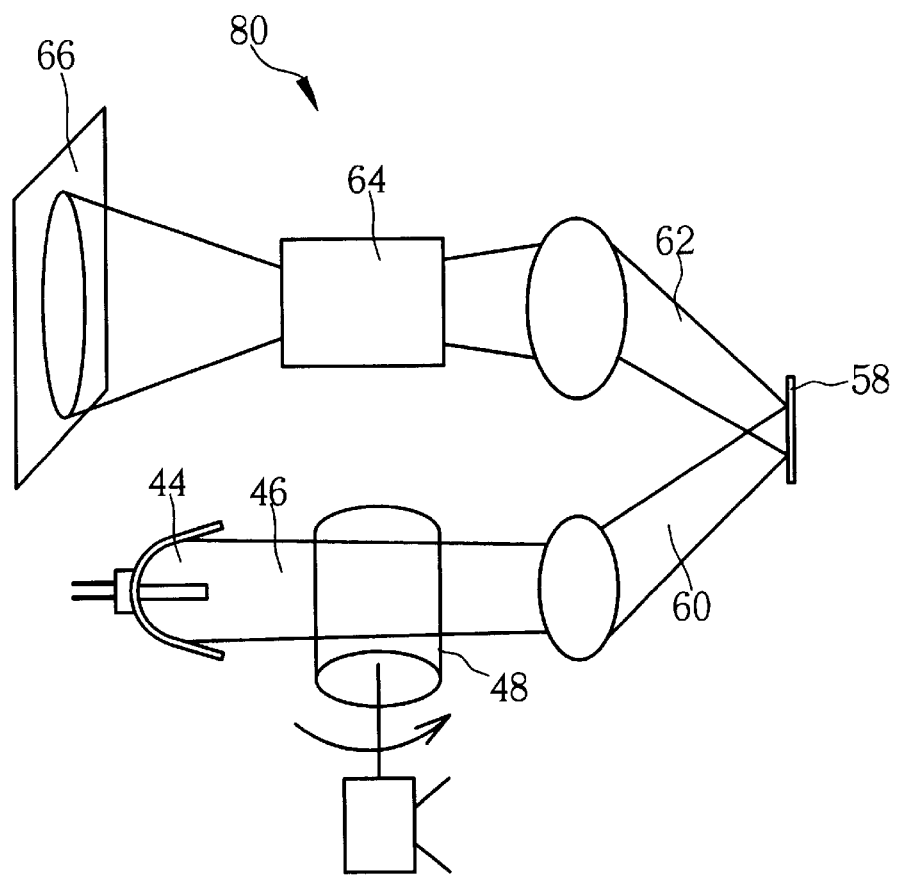
FIG. 8 is a schematic diagram of another projecting device according to the present invention.

Please refer to FIG. 8. FIG. 8 is a schematic diagram of another projecting device 80 according to the present invention. In FIG. 8, the color tube 48 is installed between the light source 44 and the optical modulator 58. The trichrome light beam 46 from the light source 44 is transmitted through the cylindrical side 68 of the color tube 48 and converted into the red, green and blue light beams 60 by the color tube 48. The optical modulator 58 can be a digital micro-mirror device or a liquid crystal display panel. It will modulate an image into each of the red, green and blue light beams 60 to generate a modulated light beam 62. The projecting lens 64 will then project the modulated light beam 62 onto a screen 66.

Compared with the projecting device 10, the projecting device 40, 80 utilizes the cylindrical color tube 48 to filter the trichrome light beam 46 into the red, green and blue light beams 60. As seen in FIGS. 5 and 8, when filtering the light beam 46, the light, beam 46 will travel through the center portion of the color tube 48, reducing the size of the color tube 48. Since the color tube 48 only occupies comparably small space inside the housing 42 of the projecting device 40, 80, reducing the size of the projecting device 40, 80, and making the projecting device 40, 80 marketable.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. A projecting device comprising:
   a housing;
   a light source installed in the housing for generating a trichrome light beam;
   a cylindrical color tube rotatably installed in the housing, having at least three transparent color-filters installed along its cylindrical side for allowing the trichrome light beam to pass through the transparent color-filters to generate corresponding monochrome light beams of various colors;
   a driving device installed in the housing for rotating the color tube so as to generate different monochrome light beams one by one;
   an optical modulator installed in the housing for converting an image signal into an image and modulating the image into each of the monochrome light beams outputted from the color tube to generate a modulated light beam; and
   a projecting lens installed in the housing for projecting the modulated light beam onto a screen.

2. The projecting device of claim 1 wherein the driving device is an electric motor.

3. The projecting device of claim 1 wherein the cylindrical side of the color tube has two circular ends wherein the optical modulator is positioned inside the cylindrical side of the color tube and the monochrome light beams generated by the color filters of the color tube will be reflected by the optical modulator toward one of the circular ends.

4. The projecting device of claim 1 wherein the color tube is installed between the light source and the optical modulator and the trichrome light beam from the light source is transmitted through the cylindrical side of the color tube and converted into the monochrome light-beams by the color tube.

5. The projecting device of claim 1 wherein the optical modulator is a digital micro-mirror device.

6. The projecting device of claim 1 wherein the optical modulator is a liquid crystal display panel.

7. The projecting device of claim 1 wherein each of the color filters is of an approximately rectangular shape.

8. The projecting device of claim 1 wherein the monochrome light beams are red, green and blue light beams.

9. The projecting device of claim 1 wherein each of the color filters is a dichroic filter.

* * * * *